(12) United States Patent
Clark et al.

(10) Patent No.: US 10,364,846 B2
(45) Date of Patent: Jul. 30, 2019

(54) SEAL RUNNER

(71) Applicant: United Technologies Corporation, Hartford, CT (US)

(72) Inventors: Thomas E. Clark, Sanford, ME (US); Gary L. Grogg, South Berwick, ME (US); Eric Charles Mundell, South Berwick, ME (US)

(73) Assignee: United Technologies Corporation, Farmington, CT (US)

( * ) Notice: Subject to any disclaimer, the term of this patent is extended or adjusted under 35 U.S.C. 154(b) by 658 days.

(21) Appl. No.: 15/075,871

(22) Filed: Mar. 21, 2016

(65) Prior Publication Data

US 2016/0238137 A1 Aug. 18, 2016

Related U.S. Application Data

(63) Continuation of application No. PCT/US2014/060717, filed on Oct. 15, 2014.
(Continued)

(51) Int. Cl.
| | |
|---|---|
| *F16J 15/16* | (2006.01) |
| *F01D 25/18* | (2006.01) |
| *F01D 25/16* | (2006.01) |
| *F16C 33/72* | (2006.01) |
| *F01D 11/00* | (2006.01) |
| *F16C 37/00* | (2006.01) |

(52) U.S. Cl.
CPC ............ *F16C 37/00* (2013.01); *F01D 25/162* (2013.01); *F01D 25/183* (2013.01); *F16C 33/72* (2013.01); *F16J 15/162* (2013.01); *F01D 11/003* (2013.01); *F05D 2230/60* (2013.01)

(58) Field of Classification Search
CPC ...... F01D 11/003; F01D 25/12; F01D 25/125; F01D 25/183; F01D 25/162; F02C 7/06; F02C 7/28; F16J 15/162
See application file for complete search history.

(56) References Cited

U.S. PATENT DOCUMENTS

| | | | |
|---|---|---|---|
| 4,465,427 A | 8/1984 | Libertini et al. | |
| 4,888,947 A * | 12/1989 | Thompson | F01D 25/20 60/39.08 |

(Continued)

OTHER PUBLICATIONS

International Preliminary Report on Patentability dated Jun. 21, 2016 in Application No. PCT/US2014/060717.
(Continued)

*Primary Examiner* — Nicholas L Foster
(74) *Attorney, Agent, or Firm* — Snell & Wilmer, L.L.P.

(57) ABSTRACT

A seal runner may have an inner annular member, an outer annular member, and a radial wall member joined to the inner annular member according to an angle and extending from the inner annular member to the outer annular member. The seal runner may be positioned axially along a shaft and a bearing may be positioned axially along the shaft such that it is radially between the inner annular member and the outer annular member. In this regard, the seal runner may resemble a "C-shape." A seal may interface with a seal land radially outboard of the outer annular member. Thus, the seal may be positioned axially near to the bearing so that the axial length of a shaft and accompanying bearing compartment hardware may be minimized.

13 Claims, 4 Drawing Sheets

Related U.S. Application Data (60) Provisional application No. 61/919,229, filed on Dec. 20, 2013.

(56) References Cited

U.S. PATENT DOCUMENTS

| | | | | |
|---|---|---|---|---|
| 4,901,523 | A * | 2/1990 | Huelster | F01D 5/026 |
| | | | | 416/198 A |
| 5,301,957 | A * | 4/1994 | Hwang | F16C 33/76 |
| | | | | 277/350 |
| 5,593,165 | A | 1/1997 | Murray et al. | |
| 5,813,830 | A * | 9/1998 | Smith | F16J 15/442 |
| | | | | 277/349 |
| 7,344,139 | B2 * | 3/2008 | Gaebler | F01D 11/04 |
| | | | | 277/431 |
| 8,100,666 | B2 | 1/2012 | Makuszewski | |
| 8,678,741 | B2 * | 3/2014 | Olennikov | F01D 11/003 |
| | | | | 415/1 |
| 9,115,592 | B2 * | 8/2015 | Gauthier | F01D 11/001 |
| 10,100,672 | B2 * | 10/2018 | Vdoviak, Jr. | F02C 7/06 |
| 2006/0033289 | A1 * | 2/2006 | Gaebler | F01D 11/04 |
| | | | | 277/427 |
| 2011/0223003 | A1 * | 9/2011 | Olennikov | F01D 11/003 |
| | | | | 415/1 |
| 2012/0189429 | A1 | 7/2012 | Witlicki | |
| 2013/0015018 | A1 * | 1/2013 | Gauthier | F01D 11/001 |
| | | | | 184/6.11 |
| 2016/0032771 | A1 * | 2/2016 | Vdoviak, Jr. | F02C 7/06 |
| | | | | 277/358 |
| 2016/0238135 | A1 * | 8/2016 | Clark | F01D 25/18 |
| 2019/0017414 | A1 * | 1/2019 | Vdoviak, Jr. | F02C 7/06 |

OTHER PUBLICATIONS

International Search Report and Written Opinion dated Jan. 21, 2015 in Application No. PCT/US2014/060717.

* cited by examiner

SEAL RUNNER

CROSS-REFERENCE TO RELATED APPLICATIONS

This application is a continuation of, claims priority to and the benefit of, PCT/US2014/060717 filed on Oct. 15, 2014 and entitled "SEAL RUNNER," which claims priority from U.S. Provisional Application No. 61/919,229 filed on Dec. 20, 2013 and entitled "SEAL RUNNER." Both of the aforementioned applications are incorporated herein by reference in their entirety.

STATEMENT REGARDING GOVERNMENT RIGHTS

These inventions were made with government support under FA8650-09-D-2923-AETD awarded by the United States Air Force. The government has certain rights in these inventions.

FIELD

The present disclosure relates to seal runners, and more specifically, to seal runners for use in bearing compartments.

BACKGROUND

Seal runners are often mounted to a spinning shaft to facilitate bearing support of the shaft and to retain oil. Seal runners are typically used in conjunction with shaft bearings. Seal runners are typically designed with a low axial length-to-radius aspect ratio and support mechanical seals. Current seal runners implement this low aspect ratio to enhance stability of the seal runner in response to rotation with the shaft, however, current seal runners occupy significant axial space on the shaft in order to avoid interference with the bearings and bearing compartment hardware.

SUMMARY

In various embodiments, a seal runner system is disclosed having a seal runner disposed circumferentially around a shaft, an air cavity disposed facially about an annulus of a face of the seal runner and covered by a heat shield, a bearing disposed circumferentially around the shaft at a position axially abutting the seal runner, and a bearing nut disposed circumferentially around the shaft at a position axially abutting the bearing. The bearing nut is configured to retain the bearing and the seal runner in fixed axial position with respect to the shaft. The bearing and the seal runner are prevented from traveling axially in the positive X direction.

In various embodiments, a seal runner system is disclosed having a seal runner disposed circumferentially around a shaft, an air cavity disposed facially about an annulus of a face of the seal runner and covered by a heat shield, a bearing disposed circumferentially around the shaft at a position axially abutting the seal runner, and a bearing nut disposed circumferentially around the shaft at a position axially abutting the bearing. The bearing nut is configured to retain the bearing and the seal runner in fixed axial position with respect to the shaft. The bearing and the seal runner are prevented from traveling axially in the positive X direction. The seal runner has an inner annular member having a plurality of snap portions configured to mechanically interface with a circumferential portion of the shaft, a lower fluid passage configured to receive a cooling/lubricating fluid, a radial fluid passage configured to permit the cooling/lubricating fluid to pass from the lower fluid passage and through the inner annular member of the seal runner, an outer annular member comprising a seal land configured to mechanically interface with a seal, and a radial wall member joined to the inner annular member according to an angle and extending from the inner annular member to the outer annular member. The outer annular member is held in mechanical communication with the inner annular member.

In various embodiments a seal runner system may be assembled according to various methods including pressing a seal runner down the axial length of a shaft. The seal runner includes an inner annular member having a plurality of snap portions. The shaft includes an axial shoulder and an axial land wherein the snap portion of the inner annular member fits in mechanical communication against the axial land. The method further includes positioning the seal runner along the shaft by contacting the seal runner against the axial land whereby further travel forward along the length of the shaft is prevented. The method further includes pressing a bearing axially down the length of the shaft, so that the bearing rests in mechanical communication against the inner annular member of the seal runner. Moreover, the method includes tightening a bearing nut axially along the length of a shaft, so that the bearing nut rests in mechanical communication against the bearing, whereby the bearing and the seal runner are secured between the axial shoulder and the bearing nut and prevented from axial travel along shaft.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

As used herein, "behind" or "aft of" means disposed at a position along the X axis illustrated in the figures having a smaller positive value, or a greater negative value with respect to the origin of the axes system than the component that said item is located "behind." For example, if a first item is located behind a second item, the first item is disposed at a position along the X axis illustrated in the figures having a smaller positive value, or a greater negative value with respect to the origin of the axes system than the second item.

As used herein, "in front of" or "forward of" means disposed at a position along the X axis illustrated in the figures having a greater positive value, or a lesser negative value with respect to the origin of the axes system than the component that said item is located "in front of." For example, if a first item is located in front of a second item, the first item is disposed at a position along the X axis illustrated in the figures having a greater positive value, or a smaller negative value with respect to the origin of the axes system than the second item.

In various embodiments, a seal runner system may comprise a seal runner, an air cavity, a heat shield, a shaft, a bearing centering spring, a bearing, a seal assembly, and a bearing nut. For example, with reference to FIG. 1, a seal runner system 200 may comprise a seal runner 38, an air cavity 30, a heat shield 28, a shaft 22, a bearing centering spring 20, a bearing 18, a seal assembly 36, and a bearing nut 16.

Figure 2:
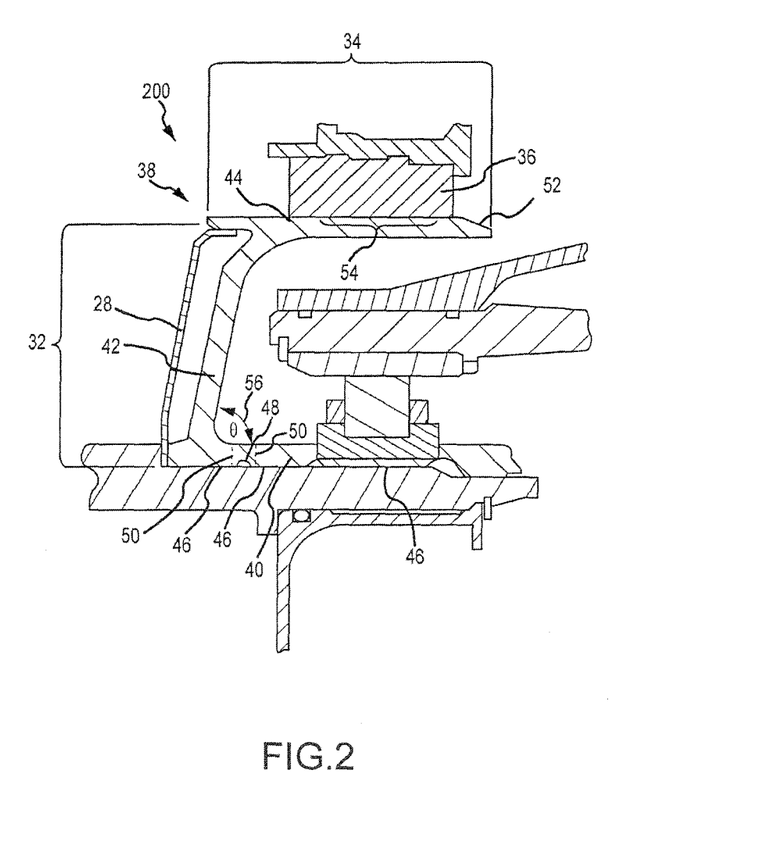
FIG. 2 illustrates various aspects of a seal runner in accordance with various embodiments.
Figure 4:
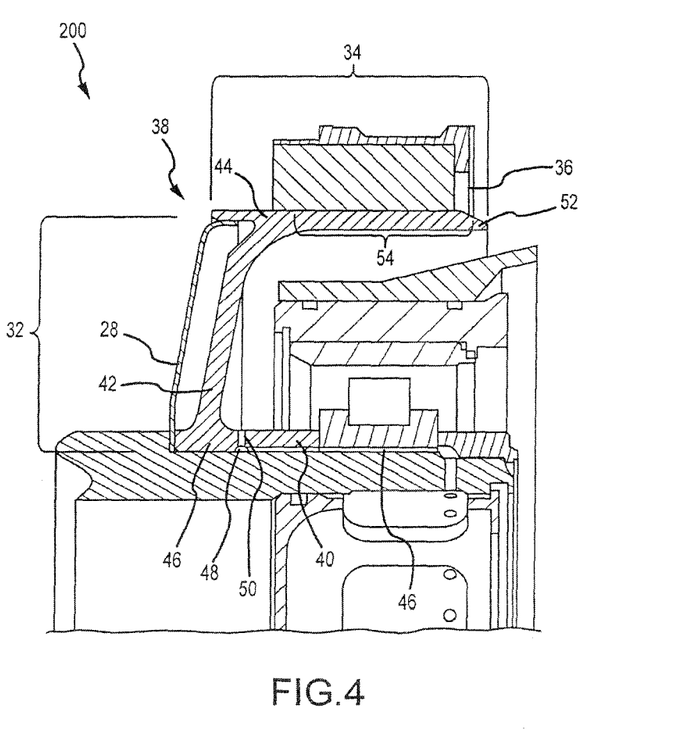
FIG. 4 illustrates various aspects of a seal runner in accordance with various embodiments.

With reference to FIGS. 2 and 4, a seal runner 38 may have a length 34 and a radius 32. In various embodiments, the ratio of length 34 to radius 32 is not substantially greater than 1. In various embodiments, the ratio of length 43 to radius 32 is 0.5 to 1.5. However, the ratio of length 43 to radius 32 may be 0.9 to 1.2, or any other ratio wherein the ratio is not substantially greater than 1. For example, in various embodiments, the ratio of length 34 to radius 32 is approximately 1. In this regard, the seal runner 38 may be significantly taller than prior art seal runners. As used herein, "taller" means extending radially a greater distance. For example, in the direction of the Y axis according to FIG. 2. Moreover, as will be discussed further herein, seal runner 38 may comprise an inner annular member, a radial wall member, and an outer annular member. For example, with continued reference to FIGS. 2 and 4, seal runner 38 may comprise an inner annular member 40, a radial wall member 42, and an outer annular member 44. In various embodiments, the axial length of the outer annular member 44 defines the length 34 of the seal runner 38 and the radial extension of the radial wall member 42 of the seal runner 38 defines the radius 32 of the seal runner 38.

Figure 1:
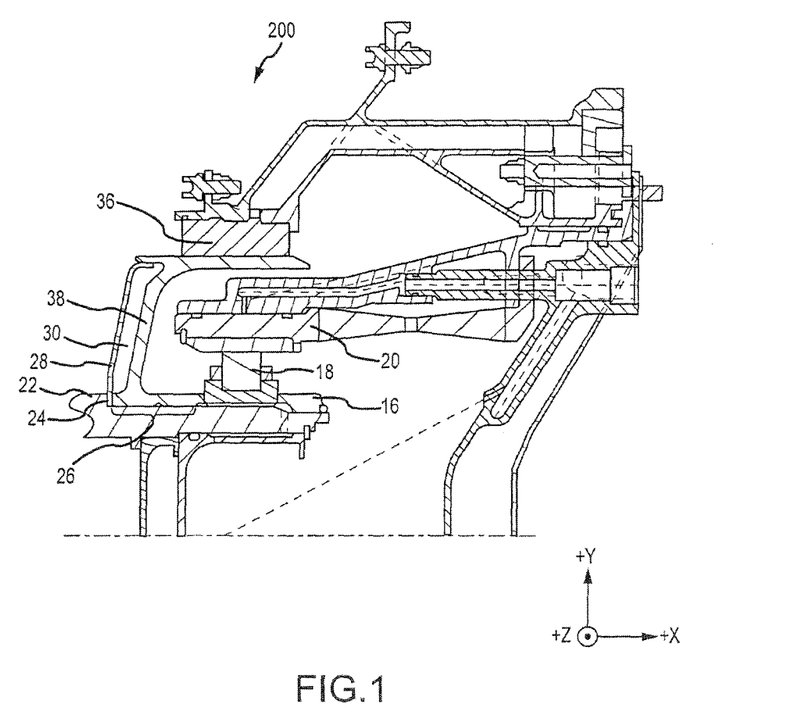
FIG. 1 illustrates various aspects of a seal runner system installed in a bearing compartment in accordance with various embodiments.

With reference to FIG. 1, in various embodiments, a seal runner system 200 may comprise an air cavity 30. In various embodiments, air cavity 30 is disposed substantially parallel to the Y axis, occupying a facial annulus of seal runner 38 parallel to the Y-Z plane, along the face of seal runner 38 comprising the forward most face (negative most face with respect to the X axis). Moreover, a seal runner system 200 may comprise a heat shield 28. In various embodiments, heat shield 28 is behind the air cavity 30. In this regard, air cavity 30 may be substantially sealed by heat shield 28. In various embodiments, heat shield 28 extends in a radial plane, for example, is disposed substantially parallel to the Y axis, occupying an annulus of air cavity 30 parallel to the Y-Z plane, along the face of air cavity 30 comprising the forward most face (negative most face with respect to the X axis).

In various embodiments, a seal runner system 200 may comprise a shaft 22. A shaft 22 may provide the axis about which seal runner 38 is disposed annularly. As a result, cooling/lubricating fluid, for example, oil, may be sealed in one section disposed about the shaft 22 by seal runner 38. For example, seal runner 38 may prevent flammable cooling/lubricating fluid from entering portions of the engine wherein the fluid may coke or auto ignite. Moreover, shaft 22 may comprise an axial land 26. Axial land 26 may comprise a portion of shaft 22 configured to accept seal runner 38. Shaft 22 may further comprise an axial shoulder 24. Axial shoulder 24 may comprise a portion of shaft 22 configured to prevent seal runner 38 from unwanted forward axial movement along shaft 22 (in the negative X direction). In various embodiments, axial land 26 comprises a portion of shaft 22 having reduced radius and axial shoulder 24 comprises a transition region wherein the shaft 22 transitions from its nominal radius to an axial land 26. In various embodiments, axial shoulder 24 is an approximately instantaneous, smooth continuous transition of approximately 90 degrees.

In various embodiments, a seal runner system may comprise a bearing 18. Because seal runner 38 may have a ratio of length 34 to radius 32 of approximately 1, radius 32 of seal runner 38 may be sufficiently large to permit bearing 18 to be circumferentially disposed about the shaft 22 and axially positioned along shaft 22 at a position wherein bearing 18 is located beneath a portion of seal runner 38. Moreover, with momentary reference to FIG. 2, in various embodiments the inner annular member 40 of seal runner 38 is shorter than length 34, further facilitating the positioning of bearing 18 to be circumferentially disposed about the shaft 72 and axially positioned along shaft 22 at a position wherein bearing 18 is located beneath a portion of seal runner 38. In various embodiments, bearing 18 abuts directly against the inner annular member 40 of seal runner 38. In various embodiments, this advantageously eliminates the need for a bearing spacer, because the seal runner 38 positions the bearing 18. With continuing reference to FIGS. 1, 2, and 4, for example, the outer annular member 44 of seal runner 38 may extend in the X-Z plane above (with reference to the Y axis) bearing 18. In various embodiments, the bearing lies between the outer annular member and the shaft with respect to the Y axis. In this regard, the axial length of seal runner system 200 may be reduced. For example, the bearing 18 may be located to traverse an Y-Z plane also traversed by seal assembly 36 and seal land 54. In this regard, the bearing 18 may be located nearer to the seal assembly 36 and seal land 54, or in various embodiments, axially coincident with the seal land 54, with respect to the X-axis.

Moreover, a seal runner system may comprise a bearing centering spring 20. A bearing centering spring 20 may extend in the forward direction (negative X direction) beneath the outer annular member 44 (FIG. 2) of seal runner 38, and may interface with bearing 18. Bearing centering spring 20 may exert a centering force on bearing 18 to prevent unwanted displacement, wobble or other movement of shaft 22.

In various embodiments, a seal runner system may comprise a bearing nut 16. Bearing nut 16 may be positioned along shaft 22 according to FIG. 1, wherein bearing out 16 prevents bearing 18 and seal runner 38 from undesired aft axial travel along shaft 22 (in the positive X direction). For example, seal runner 38 may be positioned against axial shoulder 24 of shaft 22, for example, atop axial land 26. Bearing 18 may be positioned along the X axis to the opposite side of seal runner 38 (in front of seal runner 38), and bearing nut 16 may be positioned along the X axis to the opposite side of bearing 18 (in front of bearing 18). In this regard, bearing nut 16 may retain seal runner 38 and bearing 18 in proper position and prevent unwanted axial movement along shaft 22 in the aft direction (positive X direction).

Now, with reference to FIGS. 2 and 4, a seal runner 38 may comprise an inner annular member 40, a radial wall member 42, and an outer annular member 44. Inner annular member 40 may lie annularly about shaft 22 and extend along the X axis. Inner annular member 40 and radial wall member 42 may adjoin according to angle 56. In various embodiments, angle 56 comprises an angle less than 90 degrees, for example 75 to 89 degrees, so that radial wall member 42 is not perpendicular to inner annular member 40. In various embodiments, angle 56 comprises an angle of approximately 90 degrees. In various embodiments, inner annular member 40 and radial wall member may connect according to any angle adapted to enhance the stability of seal runner 38. Outer annular member 44 may connect to radial wall member and extend parallel to inner annular member 40. In this regard, a section view of seal runner 38 may approximate a "C-shape" section.

Inner annular member may comprise snap portions 46. As illustrated in FIGS. 2 and 4, snap portion 46 may interface in mechanical communication with shaft 22. In various embodiments, inner annular member 40 comprises two snap portions 46, though inner annular member 40 may comprise one snap portion, or any number of snap portions adapted to retain inner annular member 40 in mechanical communication with shaft 22. In various embodiments, snap portion 46 may engage in mechanical communication with at least one of axial land 26 of shaft 22.

Inner annular member may further comprise a lower fluid passage 48. In various embodiments, lower fluid passage 48 comprises an annular raised portion of inner annular member 40 extending between two snap portions 46. In this regard, lower fluid passage 48 permits the flow of coolant/lubricant annularly about an aperture between inner annular member 40 and shaft 22 and into radial fluid passages 50.

In various embodiments, inner annular member 40 may further comprise radial fluid passages 50 extending radially through inner annular member 40, permitting cooling fluid to flow from lower fluid passage 48 outboard discretely into the bearing compartment. In this manner, cooling fluid may be conveyed between bearing 18 and lower fluid passage 48.

In various embodiments, outer annular member 44 may comprise a seal land 54. Seal land 54 may comprise a surface of outer annular member 44 adapted to interface with a seal assembly 36. In this regard, the cooling fluid conveyed to bearing 18 may be sealed from other portions of the engine, for example, portions wherein the fluid may coke or combust.

Furthermore, outer annular member 44 may comprise a chamfer 52. The end of outer annular member 44 extending in the positive most direction with respect to the X axis may be chamfered so as to facilitate easier installation of seal runner 38 beneath seal assembly 36. For example, a chamfer 52 may facilitate passage of outer annular member 44 beneath seal assembly 36 without excessive interference or occlusion.

Figure 3:
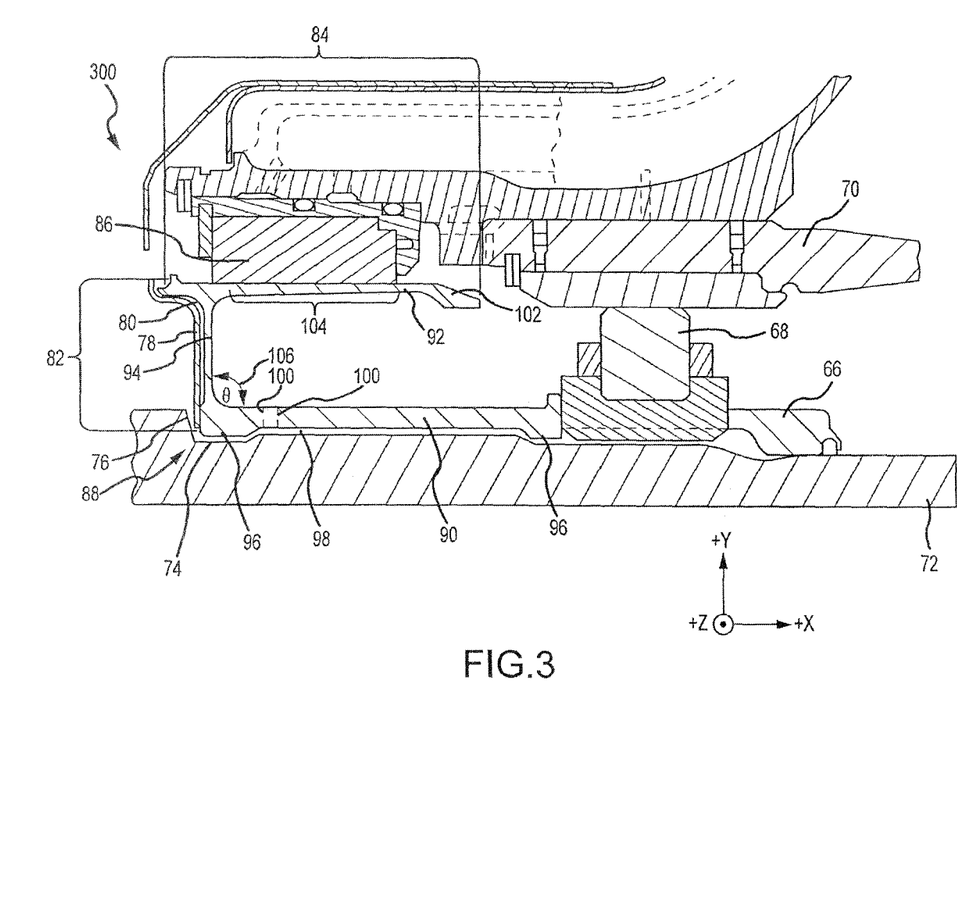
FIG. 3 illustrates various aspects of a seal runner system installed in a bearing compartment in accordance with various embodiments.

Now, with reference to FIG. 3, in various embodiments, a seal runner system 300 may comprise a seal runner 88 disposed behind a bearing 68. A seal runner system 300 may comprise a seal runner 88, an air cavity 80, a heat shield 78, a shaft 72, a bearing centering spring 70, a bearing 68, a seal assembly 86, and a bearing nut 66.

A seal runner 88 may have a length 84 and a radius 82. In various embodiments, the ratio of length 84 to radius 82 is not substantially greater than 1 but rather, is approximately 1. In this regard, the seal runner 88 may be significantly taller than prior art seal runner. As used herein, "taller" means extends radially a greater distance, For example, in the direction of the Y axis a greater distance. Moreover, as will be discussed further herein, seal runner 88 may comprise an inner annular member, a radial wall member, and an outer annular member. For example, seal runner 88 may comprise an inner annular member 90, a radial wall member 92, and an outer annular member 94.

In various embodiments, a seal runner system 300 may comprise an air cavity 80. In various embodiments, air cavity 80 is disposed substantially parallel to the Y axis, occupying an annulus of seal runner 88 parallel to the Y-Z plane, along the face of seal runner 88 comprising the forward most face (negative most face with respect to the X axis). Moreover, a seal runner system 300 may comprise a heat shield 78. In various embodiments, heat shield 78 is behind the air cavity 80. In this regard, air cavity 80 may be substantially sealed by heat shield 78. In various embodiments, heat shield 78 extends in a radial plane, for example, is disposed substantially parallel to the Y axis, occupying an annulus of air cavity 80 parallel to the Y-Z plane, along the face of air cavity 80 comprising the forward most face (negative most face with respect to the X axis).

In various embodiments, a seal runner system 300 may comprise a shaft 72. For example, seal runner 88 may be disposed annularly about an axis provided by shaft 72. In this regard, seal runner 88 may seal cooling/lubricating fluid, for example, oil, in one section disposed about the shaft 72. For example, seal runner 88 may prevent flammable cooling/lubricating fluid from entering portions of the engine wherein the fluid may catch fire. Moreover, shaft 72 may comprise an axial land 76. Axial land 76 may comprise a portion of shaft 72 configured to accept seal runner 88. Shaft 72 may comprise an axial shoulder 74. Axial shoulder 74 may comprise a portion of shaft 72 configured to prevent seal runner 88 from unwanted axial movement along shaft 72 in the forward direction (negative X direction). In various embodiments, axial land 76 comprises a portion of shaft 72 having increased radius and axial shoulder 74 comprises the transition region wherein the shaft 72 transitions from its nominal radius to an axial land 76. In various embodiments, axial shoulder 74 is an approximately instantaneous, smooth continuous transition of approximately 90 degrees.

In various embodiments, a seal runner system may comprise a bearing 68. In various embodiments, seal runner 88 may have a ratio of length 84 to radius 82 of approximately 1, or may have any ratio of length 84 to radius 82. In various embodiments, bearing 68 may be circumferentially disposed about the shaft 72 and axially positioned along shaft 72 at a position wherein bearing 68 is not located beneath a portion of seal runner 88 but is located in front of seal runner 88. In various embodiments, inner annular member 90 is longer than length 84, so that bearing 68 abuts against inner annular member 90 and is located at a position along the shaft 72 immediately adjacent to seal runner 88. In these regards, seal runner system 300 may differ from seal runner system 200 (FIGS. 1, 2, and 4), in accordance with various embodiments. Moreover, this eliminates the need for a bearing spacer, because the seal runner 88 positions the bearing 68.

Moreover, a seal runner system 300 may comprise a bearing centering spring 70. A bearing centering spring 70 may extend in the forward (negative X direction), terminating in front of the inner annular member 90 and the outer annular member 94 of seal runner 88, and may interface with bearing 68. In this regard, bearing centering spring 70 may not extend beneath the outer annular member 94 of seal runner 88. In this regard, seal runner system 300 may differ from seal runner system 200 (FIGS. 1, 2, and 4), in accordance with various embodiments. Bearing centering spring 70 may exert a centering force on bearing 68 to prevent unwanted displacement, wobble or other movement of shaft 72.

In various embodiments, a seal runner system may comprise a bearing nut 66. Bearing nut 66 may be positioned along shaft 72, wherein bearing nut 66 prevents bearing 68 and seal runner 88 from undesired axial travel along shaft 72. For example, seal runner 88 may be positioned against axial shoulder 74 of shaft 72, for example, atop axial land 76. Bearing 68 may be positioned along the X axis to the opposite side of seal runner (in front of seal runner 88), and bearing nut 66 may be positioned along the X axis to the opposite side of bearing 68 (in front of bearing 68). In this regard, bearing nut 66 may retain seal runner 88 and bearing 68 in proper position and prevent unwanted axial movement along shaft 72 in the aft direction (positive X direction).

A seal runner 88 may comprise an inner annular member 90, a radial wall member 92, and an outer annular member 94. Inner annular member 90 may lie annularly about shaft 72 and extend along the X axis. Inner annular member 90 and radial wall member 92 may adjoin according to angle 106. In various embodiments, angle 106 comprises an angle of approximately 90 degrees, so that radial wall member 92 is approximately perpendicular to inner annular member 90. In this regard, seal runner system 300 may differ from seal runner system 200 (FIGS. 1, 2, and 4), in accordance with various embodiments. Outer annular member 94 may connect to radial wall member and extend parallel to inner annular member 90. In this regard, a section view of seal runner 88 may approximate a "C-shape" section.

Inner annular member may comprise snap portions 96. Snap portion 96 may interface in mechanical communication with shaft 72. In various embodiments, inner annular member 90 comprises two snap portions 96, though inner annular member 90 may comprise one snap portion, or any number of snap portions adapted to retain inner annular member 90 in mechanical communication with shaft 72. In various embodiments, snap portions 96 engage in mechanical communication with at least one axial land 76 of shaft 72.

Inner annular member may further comprise a lower fluid passage 98. In various embodiments, lower fluid passage 98 comprises an annular raised portion of inner annular member 90 extending between two snap portions 96. In this regard, lower fluid passage 98 permits the flow of coolant/lubricant annularly about an aperture between inner annular member 90 and shaft 72 and into radial fluid passages 100.

In various embodiments, inner annular member 90 may further comprise radial fluid passages 100 extending radially through inner annular member 90, permitting cooling/lubricating fluid to flow from lower fluid passage 98 to the area of the engine shielded in front of the seal runner annularly about the shaft 72. In this manner, cooling/lubricating fluid may be conveyed from bearing 68 to the seal runner lower fluid passage 98.

In various embodiments, outer annular member 94 may comprise a seal land 104. Seal land 104 may comprise a surface of outer annular member 94 adapted to interface with a seal assembly 86. In this regard, the cooling/lubricating fluid conveyed to bearing 68 may be sealed from other portions of the engine, for example, portions wherein the fluid may coke or combust.

Furthermore, outer annular member 94 may comprise a chamfer 102. The end of outer annular member 94 extending in the aft direction (positive most direction with respect to the X axis) may be chamfered so as to facilitate easier installation of seal runner 88 beneath seal assembly 86. For example, a chamfer 102 may facilitate passage of outer annular member 94 beneath seal assembly 86 without excessive interference or occlusion.

Now, having described various components of seal runner systems, a seal runner system 200 may be used according to various methods, for example, a shaft 22 may rotate and cooling/lubricating fluid may be introduced into radial fluid passage 50. The cooling/lubricating fluid may flow from lower fluid passage 48 into radial fluid passage 50 and into the area proximate to seal land 54. In this manner, seal land 54 may be cooled/lubricated. Seal assembly 36 may interface with seal land 54 of outer annular member 44 of seal runner 38, whereby the cooling/lubricating fluid is prevented from escaping. Bearing centering spring 20 may mechanically interface with bearing 18 whereby, the shaft 22 may be supported while it rotates.

Moreover, in various embodiments, a seal runner system 300 may be used according to various methods, for example, a shaft 72 may rotate and cooling/lubricating fluid may be introduced into radial fluid passage 100. The cooling/lubricating fluid may flow from lower fluid passage 98 into radial fluid passage 100 and into the area proximate to seal land 104. In this manner, seal land 104 may be cooled/lubricated. Seal assembly 86 may interface with seal land 104 of outer annular member 94 of seal runner 88, whereby the cooling/lubricating fluid is prevented from escaping. Bearing centering spring 70 may mechanically interface with bearing 68 whereby, the shaft 72 may be supported while it rotates.

Having described various components of seal runner systems and methods of using seal runner systems, a seal runner system 200 may be manufactured according to various methods. For example, a seal runner 38 may be pressed axially down the length of a shaft 22, so that snap portions 46 of inner annular member 40 fit in mechanical communication against axial land 26 portions of the circumferential surface of shaft 22. Moreover, seal runner 38 may be circumferentially disposed about the shaft 22 and axially positioned along the shaft 22 by contacting axial land 26 whereby further travel down the length of shaft 22 is prevented. Subsequently a bearing 18 may be pressed axially down the length of a shaft 22, so that the bearing rests in mechanical communication against inner annular member 40. Finally, a bearing nut 16 may be tightened along the length of a shaft 22, and so that the bearing 18 and the seal runner 38 are prevented from unwanted axial travel along shaft 22. In various embodiments, the snap portions 46 of inner annular member 40 of seal runner 38 are manufactured to have between 0.4 and 10 thousandths of an inch of interference fit with the shaft 22. In this manner, the seal runner may securely interface in mechanical communication with the shaft 22.

Similarly, a seal runner system 300 may be manufactured according to various methods. For example, a seal runner 88 may be pressed axially down the length of a shaft 72, so that snap portions 96 of inner annular member 90 fit in mechanical communication against axial land 76 portions of the circumferential surface of shaft 72. Moreover, seal runner 88 may be circumferentially disposed about the shaft 72 and axially positioned along the shaft 72 by contacting axial land 76 whereby further travel down the length of shaft 72 is prevented. Subsequently a bearing 68 may be pressed axially down the length of a shaft 72, so that the bearing rests in mechanical communication against inner annular member 90. Finally, a bearing nut 66 may be tightened along the length of a shaft 72, and so that the bearing 68 and the seal runner 88 are prevented from unwanted axial travel along shaft 72. In various embodiments, the snap portions 96 of inner annular member 90 of seal runner 88 are manufactured to have between 0.4 and 10 thousandths of an inch of interference with the shaft 72. In this manner, the seal runner may securely interface in mechanical communication with the shaft 72.

Now, having described various components of seal runner systems, methods of using seal runner systems, and methods of manufacturing seal runner systems, various components of seal runner systems may be manufactured from various materials. In various embodiments, various components of seal runner systems, for example, the seal runner, may comprise steel. Moreover, in various embodiments, the heat shield may comprise nickel alloy. However, in further embodiments, various components of seal runner systems may comprise other metals, such as titanium, tungsten, aluminum, alloys, or stainless steel, though they may further comprise numerous other materials configured to provide mechanical resiliency and/or support of the system when subjected to wear in an operating environment or to satisfy other desired electromagnetic, chemical, physical, or biological properties such as strength, durability, ductility, heat tolerance, thermal dissipation, and footprint constraints, among others. In various embodiments, various portions of seal runner systems as disclosed herein are made of different materials or combinations of materials, and/or may comprise coatings.

In various embodiments, a seal assembly may comprise carbon. However, a seal assembly may comprise other materials including ceramic or polymer. Moreover, a seal assembly may comprise multiple materials, or any material configuration suitable to enhance or reinforce the resiliency and/or support of the system when subjected to wear in an operating environment or to satisfy other desired electromagnetic, chemical, physical, or biological properties such as strength, durability, ductility, heat tolerance, thermal dissipation, and footprint constraints, among others.

In various embodiments, the present disclosure provides a seal runner system with improved axial compactness and an ability to support a shaft with dynamic and static stability.

In various embodiments, while the seal runner systems described herein have been described in the context of turbine shaft applications, one will appreciate in light of the present disclosure, that the seal runner systems described herein may be used on any shaft, for example, generator shafts, internal combustion engine shafts, and axle shafts. Moreover, the seal runner systems described herein may be employed with any suitable shaft in any installation.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal runner system comprising:
a seal runner disposed circumferentially around a shaft and comprising an outer annular member comprising a seal land configured to mechanically interface with a seal;
an air cavity disposed facially about an annulus of a face of the seal runner and covered by a heat shield;
a bearing disposed circumferentially around the shaft, wherein the bearing abuts a snap portion of an inner annular member of the seal runner; and
a bearing nut disposed circumferentially around the shaft at a position axially abutting the bearing, the bearing nut being configured to retain the bearing and the seal runner in fixed axial position with respect to the shaft, whereby the bearing and the seal runner are prevented from traveling axially in the aft direction, wherein the outer annular member and the seal extend axially above and radially overlapping the bearing, and wherein the bearing lies between the outer annular member and the shaft.

2. The seal runner system according to claim 1, wherein the an inner annular member further comprises:

the snap portion configured to mechanically interface with a circumferential portion of the shaft;

a lower fluid passage configured to receive a cooling fluid;

a radial fluid passage configured to permit the cooling fluid to pass from the lower fluid passage and through the inner annular member of the seal runner; and a radial wall member monolithic with the inner annular member and joined to the inner annular member at-an angle, wherein the radial wall member extends from the inner annular member to the outer annular member, wherein the outer annular member is held in mechanical communication with the inner annular member, and wherein a length of the inner annular member to a radial extension of the radial wall member is defined according to a ratio.

3. The seal runner according to claim 2, wherein the angle comprises a 75 to 89 degree angle.

4. The seal runner according to claim 2, wherein the angle comprises a 90 degree angle.

5. The seal runner according to claim 2, wherein the ratio is approximately 1.

6. The seal runner according to claim 2, wherein the inner annular member is shorter than the outer annular member.

7. The seal runner system according to claim 2, wherein the inner annular member comprises a first snap portion proximate the outer annular member and a second snap portion axially distal of the first snap portion.

8. The seal runner system according to claim 2, wherein the outer annular member extends axially above and over the bearing, and wherein the bearing lies axially inward of a chamfer of the outer annular member.

9. The seal runner system according to claim 2, wherein the shaft further comprises an axial shoulder, and wherein the seal runner is prevented from traveling axially forward direction.

10. The seal runner system according to claim 1, further comprising a bearing centering spring adapted to mechanically interface with the bearing, wherein the shaft is supported.

11. The seal runner system according to claim 2, wherein the outer annular member further comprises a chamfer whereby installation of the seal runner beneath the seal may be facilitated.

12. The system of claim 2, wherein the seal comprises carbon.

13. The system of claim 1, wherein the seal runner comprises at least one of titanium and steel.

* * * * *